US011959154B2

(12) United States Patent
Dittrich et al.

(10) Patent No.: US 11,959,154 B2
(45) Date of Patent: Apr. 16, 2024

(54) PROCESS FOR MAKING MODIFIED DTPA-ASSOCIATED ORGANOSILICA MEDIA FOR USE IN SOLID-LIQUID EXTRACTION OF RARE EARTH ELEMENTS

(71) Applicant: Wayne State University, Detroit, MI (US)

(72) Inventors: Timothy M. Dittrich, Grosse Pointe Woods, MI (US); Matthew J. Allen, Plymouth, MI (US); Mohammed Dardona, Garden City, MI (US); Jessica L. Hovey, Garden City, MI (US)

(73) Assignee: Wayne State University, Detroit, MI (US)

(*) Notice: Subject to any disclaimer, the term of this patent is extended or adjusted under 35 U.S.C. 154(b) by 71 days.

(21) Appl. No.: 17/520,869

(22) Filed: Nov. 8, 2021

(65) Prior Publication Data

US 2022/0145422 A1    May 12, 2022

Related U.S. Application Data

(60) Provisional application No. 63/111,479, filed on Nov. 9, 2020.

(51) Int. Cl.
| | |
|---|---|
| C22B 59/00 | (2006.01) |
| B01J 20/22 | (2006.01) |
| C22B 3/24 | (2006.01) |

(52) U.S. Cl.
CPC ............... *C22B 59/00* (2013.01); *B01J 20/22* (2013.01); *C22B 3/24* (2013.01)

(58) Field of Classification Search
CPC ........... C22B 59/00; C22B 3/24; C22B 7/008; C22B 7/02; B01J 20/22
See application file for complete search history.

(56) References Cited

FOREIGN PATENT DOCUMENTS

| JP | 2876152 B2 * | 3/1999 | |
| WO | WO-2015106324 A1 * | 7/2015 | ......... B01D 11/0492 |

OTHER PUBLICATIONS

Nakashio et al. JP2876152B2—Separation and purification of rare earth metals English Translate (Year: 1999).*
Ashour et al. ACS Sustainable Chem. Eng. 2018, 6, 6889-6900 (Year: 2018).*
Nishihama et al. Hydrometallurgy 2002, 64, 35-42 (Year: 2002).*

(Continued)

*Primary Examiner* — Samir Shah
*Assistant Examiner* — Jordan W Taylor
(74) *Attorney, Agent, or Firm* — Fishman Stewart PLLC

(57) ABSTRACT

A process for making modified diethylenetriaminepentaacetic acid (DTPA)-associated media for use in solid-liquid extraction of rare earth elements is disclosed. The process includes functionalizing DTPA with hydrophobic groups to form modified DTPA; dissolving the modified DTPA into a methanol solution; loading the modified DTPA solution to a solid support; rotating the modified DTPA-loaded solid support to allow for association; and removing the methanol to obtain the modified-DTPA-associated media.

17 Claims, 10 Drawing Sheets

(56) References Cited

OTHER PUBLICATIONS

Ping Yan et al., "Fast preconcentration of trace rare earth elements from environmental samples by di(2-ethylhexyl) phosphoric acid grafted magnetic nanoparticles followed by inductively coupled plasma mass spectrometry detection," Spectrochimica Acta Part B: Atomic Spectroscopy, vol. 136, 2017, pp. 73-80.
Callura, Jonathan C. et al. "Adsorption kinetics, thermodynamics, and isotherm studies for functionalized lanthanide-chelating resins," Journal of Colloid and Interface Science, vol. 557, 2019, pp. 465-477.
Hongmin Cui et al., "A facile process for enhanced rare earth elements separation from dilute solutions using N, N-di(2-ethylhexyl)-diglycolamide grafted polymer resin," Separation and Purification Technology, vol. 234, 2020, 116096.
Roosen, Joris et al., "Recovery of scandium from leachates of Greek bauxite residue by adsorption on functionalized chitosan-silica hybrid materials," Green Chemistry, vol. 18, iss. 7, 2016, pp. 2005-2013.
Roosen, Joris et al., "Adsorption performance of functionalized chitosan-silica hybrid materials toward rare earths," J. Mater. Chem. A., vol. 2, iss. 45, 2014, p. 19415-19426.
Jessica L. Hovey et al., "Sorption of rare-earth elements onto a ligand-associated media for pH-dependent extraction and recovery of critical materials," Separation and Purification Technology, vol. 258, 2021, 118061.
Mohammedi Habib et al., "Study on the extraction of lanthanides by a mesoporous MCM-41 silica impregnated with Cyanex 272," Separation and Purification Technology, vol. 209, 2019, pp. 359-367.
Yimu Hu et al., Drouin, "Highly Efficient and Selective Recovery of Rare Earth Elements Using Mesoporous Silica Functionalized by Preorganized Chelating Ligands," ACS Applied Materials & Interfaces, vol. 9, iss. 44, 2017, pp. 38584-38593.
Wenzhong Zhang et al., "Intralanthanide Separation on Layered Titanium(IV) Organophosphate Materials via a Selective Transmetalation Process," ACS Applied Materials & Interfaces, vol. 10, No. 26, 2018, pp. 22083-22093.
Sabrina da N. Almeida et al., "Neodymium(III) and lanthanum(III) separation by magnetic nanohydrometallurgy using DTPA functionalized magnetite nanoparticles," Hydrometallurgy, vol. 161, 2016, pp. 22-28.
H. Zhang et al., "Selective Extraction of Heavy and Light Lanthanides from Aqueous Solution by Advanced Magnetic Nanosorbents," ACS Appl Material & Interfaces, vol. 8, No. 14, 2016, pp. 9523-9531.
Ashour, Radwa et al., "DTPA-Functionalized Silica Nano- and Microparticles for Adsorption and Chromatographic Separation of Rare Earth Elements," ACS Sustainable Chemistry & Engineering, vol. 6, No. 5, 2018, pp. 6889-6900.
Noack, Clinton et al., "Effects of Ligand Chemistry and Geometry on Rare Earth Element Partitioning from Saline Solutions to Functionalized Adsorbents," ACS Sustainable Chemistry & Engineering, vol. 4, No. 11, 2016, pp. 6115-6124.
S. Inan et al., "Extraction and separation studies of rare earth elements using Cyanex 272 impregnated Amberlite XAD-7 resin," Hydrometallurgy, vol. 181, 2018, pp. 156-163.
Callura, Jonathan C. et al., "Selective adsorption of rare earth elements onto functionalized silica particles," Green Chem., vol. 20, issue 7, 2018, pp. 1515-1526.
Zhang, Huijin et al., "Selective Extraction of Heavy and Light Lanthanides from Aqueous Solution by Advanced Magnetic Nanosorbents," ACS Applied Materials & Interfaces, vol. 8, No. 14, 2016, pp. 9523-9531.
Polido Legaria, et al., "Toward Molecular Recognition of REEs: Comparative Analysis of Hybrid Nanoadsorbents with the Different Complexonate Ligands EDTA, DTPA, and TTHA," Inorganic Chemistry, vol. 56, No. 22, 2017, pp. 13938-13948.
Noack, Clinton W. et al., "Effects of Ligand Chemistry and Geometry on Rare Earth Element Partitioning from Saline Solutions to Functionalized Adsorbents," ACS Sustainable Chemistry & Engineering, vol. 4, No. 11, 2016, pp. 6115-6124.
Florek, Justyna et al., "Selective recovery of rare earth elements using chelating ligands grafted on mesoporous surfaces," RSC Advances, vol. 5, issue 126, 2015, pp. 103782-103789.
I. Anastopoulos et al., "Adsorption of rare earth metals: A review of recent literature," Journal of Molecular Liquids, vol. 221, 2016, pp. 954-962.
Momen, M. A. et al., "Extraction Chromatographic Materials for Clean Hydrometallurgical Separation of Rare-Earth Elements Using Diglycolamide Extractants," Industrial & Engineering Chemistry Research, vol. 58, No. 43, 2019, pp. 20081-20089.
Katarzyna Araucz et al., "Novel multifunctional ion exchangers for metal ions removal in the presence of citric acid," Chemosphere, vol. 251, 2020, pp. 126331.
Roosen, Joris, et al., "Adsorption and chromatographic separation of rare earths with EDTA- and DTPA-functionalized chitosan biopolymers," J. Mater. Chem. A, vol. 2, issue 5, 2014, pp. 1530-1540.
Haythem Barrak et al., "Highly efficient extraction of rare earth elements and others ions from green phosphoric acid medium using TMSEDTA@GO@Fe3O4 core-shell," Separation and Purification Technology, vol. 222, 2019, pp. 145-151.

\* cited by examiner

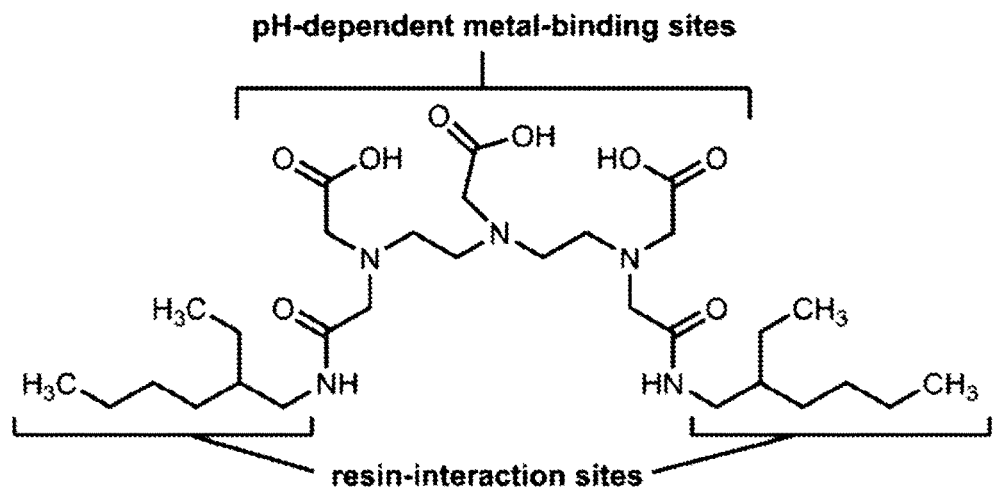
FIG. 4
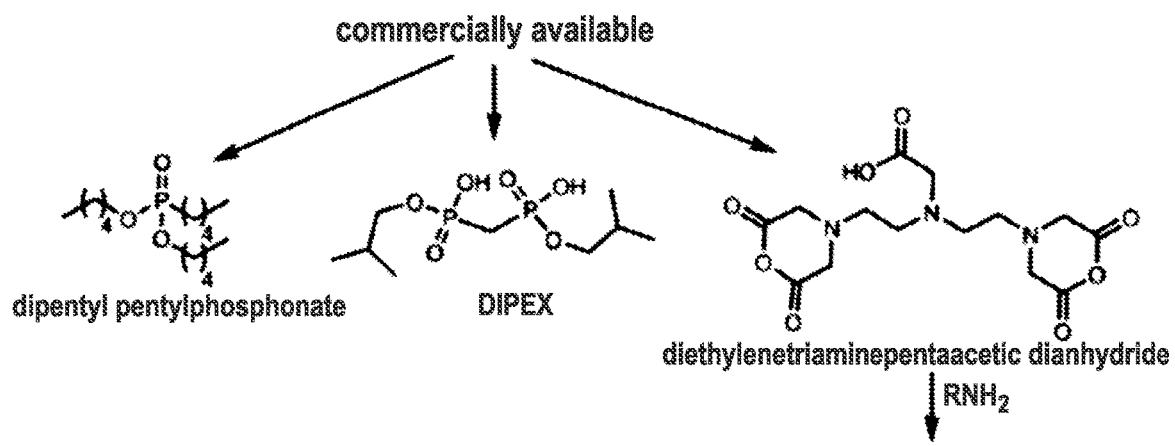
FIG. 5
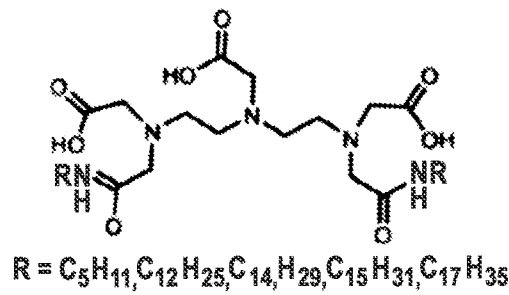

PROCESS FOR MAKING MODIFIED DTPA-ASSOCIATED ORGANOSILICA MEDIA FOR USE IN SOLID-LIQUID EXTRACTION OF RARE EARTH ELEMENTS

CROSS-REFERENCE TO RELATED APPLICATIONS

This application claims priority to U.S. Prov. App. No. 63/111,479 filed Nov. 9, 2020, the contents of which are hereby incorporated by reference in their entirety.

GOVERNMENT LICENSE RIGHTS

This invention was made with government support under contract no. DE-FE0031565 awarded by the Department of Energy. The government has certain rights in the invention.

TECHNICAL FIELD

This disclosure relates generally to a modified ligand-associated media, and particularly to a modified diethylenetriaminepentaacetic acid (DTPA)-associated media and a method of making thereof, for use, for example, in solid-liquid extraction of rare earth elements (REEs).

BACKGROUND

There is a lack of a domestic source of rare earth elements (REEs), which have many critical uses, including but not limited to the rapidly expanding electric vehicle market, cell phones, and laptops. Currently, liquid-liquid separations are employed that use a large amount of organic solvents that result in hazardous waste that is expensive (and in most cases, cost prohibitive) to dispose of.

The U.S. Department of Energy has identified the ability to separate REEs as a national security priority. Although other processes for REE concentration and separation from waste products, such as coal fly ash and electronic waste, have been proposed, there still is no economically viable technique that competes with conventional liquid-liquid separations.

As such, there exists a need for economical extraction methods from other underdeveloped sources of REEs, including but not limited to coal and coal-by products (e.g., bottom ash, fly ash).

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

FIG. 4 shows the structure and design features of bis (ethylhexyl)amido DTPA.

FIG. 5 is an illustration of structure of commercially available ligands.

FIGS. 12A and 12B are graphic illustrations of batch sorption with various experiments, wherein FIG. 12A shows sorption of trivalent REEs to controls of unmodified media at pH 3.3 and 0.9 and FIG. 12B shows selectivity of modified DTPA media at pH 3.3 and pH 0.9.

DETAILED DESCRIPTION

Figure 1:
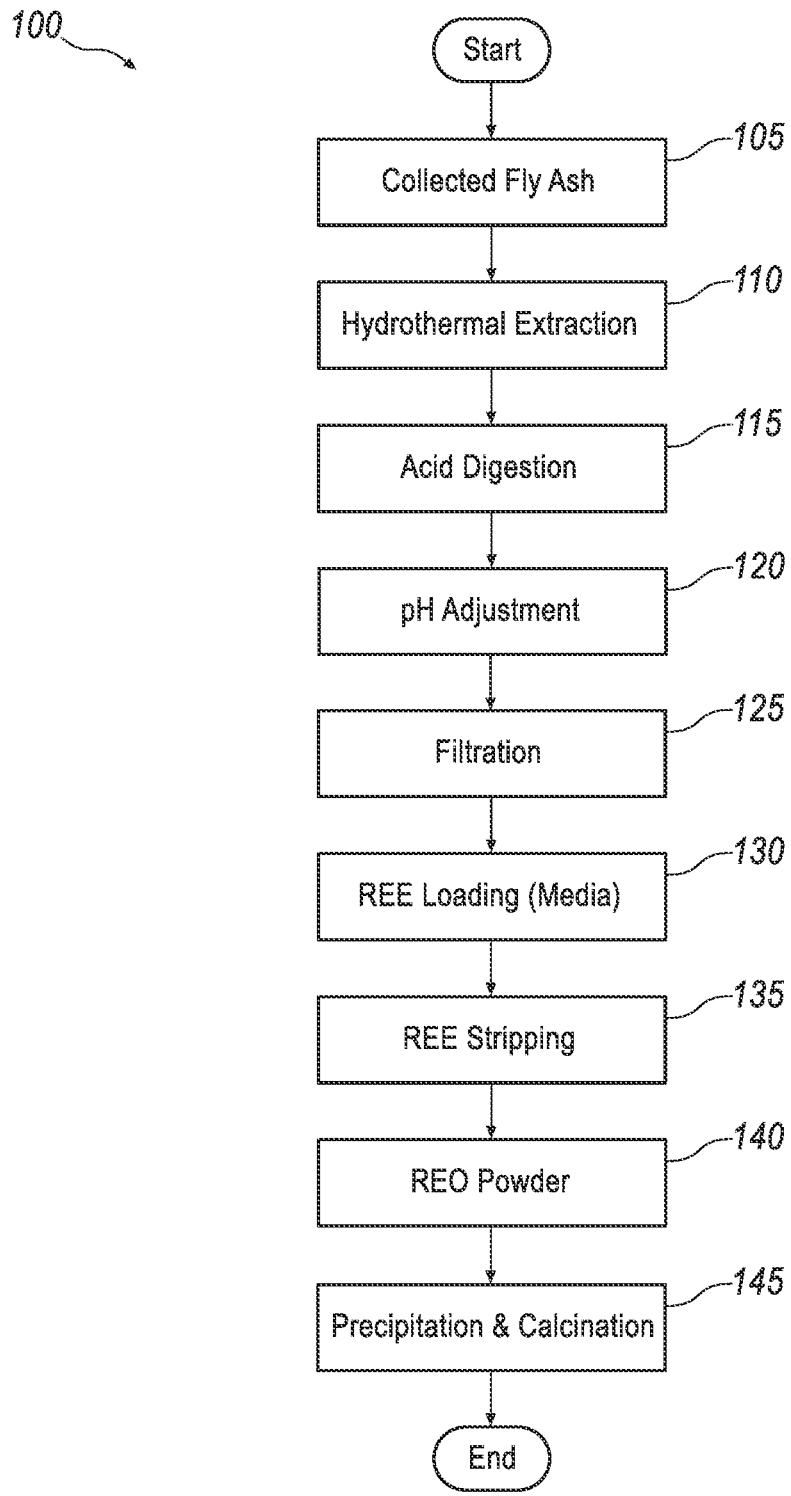
FIG. 1 shows a schematic process flow diagram of a process for extracting REEs according to teachings of the present disclosure.

The present disclosure relates to the potential to couple hydrothermal leaching of coal fly ash with the engineering of custom-ligand-associated media to provide an organic solvent-free method of extracting and recovering rare earth elements (REEs). The present disclosure describes a solid-liquid separation which removes the need for organic solvent in the separation process and facilitates increasing the efficiency and selectivity of extractions. According to the disclosure, hydrophobically modified pH-dependent ligands on solid support are used in extractions of rare-earth elements. According to an example, the ligand is diethylenetriaminepentaacetic acid (DTPA) that is synthetically modified (functionalized) to include hydrophobic branched or linear aliphatic groups/chains (e.g., alkyl groups such as two hydrophobic ethylhexyl groups). The hydrophobic chains of the modified DTPA are attached to a solid support such as hydrophobic organosilica to form a modified DTPA-associated media for use in extractions of REEs.

Pursuant to an aspect, a process for making modified DTPA-associated media for use in solid-liquid extraction of rare earth elements may include: functionalizing DTPA with hydrophobic groups to form modified DTPA; dissolving the modified DTPA into a methanol solution; loading the modified DTPA solution to a solid support; rotating (e.g., centrifuging) the modified DTPA-loaded solid support to allow for association; and removing the methanol to obtain the modified-DTPA-associated media.

For solid-liquid extraction, the choice of solid support is critically important. Pursuant to an implementation, the solid support includes an organosilica platform. Swellable organically modified silica (organosilica) was chosen as the solid support because it has a high surface area, a high capacity for organics, and features hydrophobic ethylbenzyl silane groups that are ideal for interaction with aliphatic regions of adsorbed ligands.

The hydrophobic groups may include alkyl groups. In particular, the hydrophobic groups include alkylamines. Pursuant to an implementation, the hydrophobic groups are two hydrophobic ethylhexyl groups. The two hydrophobic ethylhexyl groups anchor the ligand to the media through hydrophobic interactions, leaving three carboxylic groups to drive pH-responsive metal binding. The resulting modified DTPA, bis(ethyhexyl)amido DTPA, demonstrates the ability to bind rare-earth elements effectively and also to release them in a reasonable pH range (pH 1-5). Pursuant to another implementation, the alkylamines comprise ethylene diamine or triethylene tetra amine.

A process for extracting REEs from a source such as fly ash or electronic waste (e-waste) may include collecting a sample of coal fly ash or e-waste; performing a hydrothermal dissolution process on the sample of fly ash or e-waste to obtain a fly ash leachate or an e-waste leachate; loading a hydrophobically modified ligand to a solid support (e.g., an organosilica platform) to form a ligand-associated media; injecting the fly ash leachate or e-waste leachate through the ligand-associated media so that REEs in the fly ash leachate or the e-waste leachate may sorb to the ligand-associated media; and extracting the sorbed REEs. The ligand-associated media may be a modified DTPA-associated organosilica media including modified DTPA chemically associated with an organosilica platform, wherein the modified DTPA may include DTPA functionalized with hydrophobic groups (e.g., alkyl groups, in particular two hydrophobic ethylhexyl groups).

Referring now to the figures, FIG. 1 illustrates a schematic process diagram of an exemplary process 100 for extracting REEs from coal fly ash. At step 105, fly ash feedstock was collected from coal-fired power plants, characterized for REE content, and subjected to a bench-top batch hydrothermal leaching/dissolution process 110 inside custom-build pressure reactors. The hydrothermal dissolution process may include at least one of the following techniques: (1) flow through column; (2) high temperature Parr reactor vessels; and (3) low temperature reactor. At step 115, the solution is acidified with, e.g., nitric acid (HNO$_3$) or hydrochloric acid (HCl), and then the pH of the solution is adjusted by adding sodium hydroxide (NaOH) at step 120 and the ash solution is filtered at step 125 to obtain fly ash leachate. At step 130, the leachate is loaded with synthetically modified ligand-associated media such as, e.g., a modified DTPA-associated organosilica media where the DTPA is synthetically modified with hydrophobic groups (e.g., amines). Once the organosilica-ligand extraction media was developed for REE concentration, an acidic solution (e.g., HCl) was used to back extract and concentrate the REEs into a heavily REE-laden strip solution at step 135. At step 140, the REEs in the strip solution were precipitated with oxalate to produce rare earth oxides (REOs) at step 145. This may be done by adding oxalic acid to form a precipitate; filtering the precipitate; and calcinating the filtered precipitate.

The exemplary experiments performed as part of the project in accordance with the process of FIG. 1 will now be described in detail.

Establish Feasibility of Hydrothermal Extraction

Coal fly ash samples were collected from two different power plants. One power plant did not have sulfur removal technology, and therefore, only low sulfur western (LSW) coal is burned there. The other power plant is equipped with flue gas desulfurization (FGD) technology and burns blends of high sulfur eastern (HSE) coal and LSW coal, in addition to pet coke (a residue left from oil refining.

Complete HF digestions of the coal fly ash samples (n=9) were conducted based on a microwave acid digestion procedure. Ash standard (NIST SRM 1633C) was used as a comparison.

Hydrothermal dissolution was conducted using three techniques: (1) flow through column; (2) high temperature Parr reactor vessels (e.g., 150° C.-400° C.); and (3) low pressure/temperature commercially available reactor (e.g., ~120° C.). A custom-made hydrothermal dissolution column apparatus and high temperature reactor vessels were used to investigate suitable conditions to extract REEs from fly ash. A lower concentration fly ash (e.g., 75% LSW coal, 25% HSE coal) was used for column experiments, in which ash (e.g., 8 grams) was packed into a stainless steel column in a furnace (e.g., 250° C.).

A carbonate solution (e.g., 0.5 M $CO_3^{2-}$) was pumped through the column at a flow rate (e.g., 0.1 mL/min) for an extended period of time (e.g., 8 hours). The altered ash was then extracted from the column and various fractions (e.g., 0.5 g) were acidified with varying nitric acid concentrations (e.g., 0.1-8 M). After filtration through syringe filters (e.g., 0.45 µm), ICP-MS analysis showed that the resulting hydrothermal leachate contained 249±4.6 ppm T-REES or 77.7±1.4% of the T-REE content, based on comparison to complete HF digestions. Based on these results, nitric acid (e.g., 4-5 M) was selected for digestions.

Similar experiments as the above were performed via the low temperature/pressure reactor (~120° F.). In particular, REE hydrothermal extraction was performed with sodium carbonate addition (e.g., 1 M $Na_2CO_3$ for 4 h). After hydrothermal extraction, nitric acid (e.g., 1 M to 7 M) was added to dissolve the resulting material. Table 1 below illustrates the data for digestion kinetics experiments. From Table 1, it can be seen that most leaching has occurred by the first sample (e.g., 0.17 h).

TABLE 1

Figure 8:
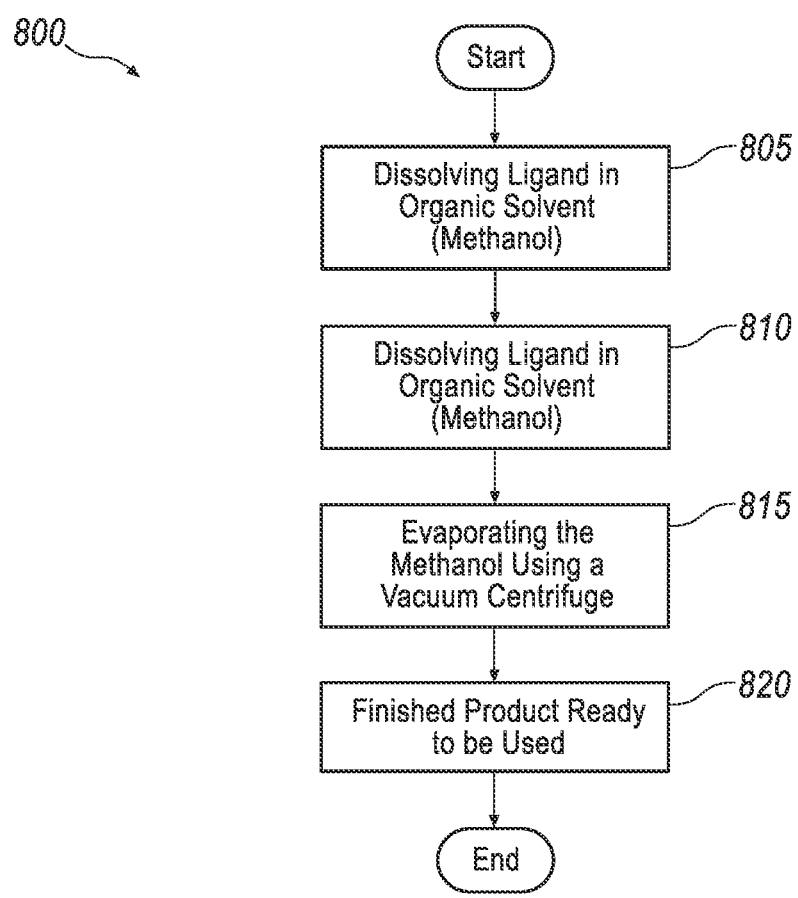
FIG. 8 illustrates a process for making ligand-associated media according to teachings of the present disclosure.

Data for digestion kinetics experiments in FIG. 8.

| EXP. | Date | Ash | Digestion Time (hrs) | HCl | Total mg REEs/Kg |
|---|---|---|---|---|---|
| MK-1 | Nov. 15, 2019 | 75/25 | 0.17 | 4M 1:4 | 195.5 |
| MK-2 | Nov. 15, 2019 | 75/25 | 0.5 | 4M 1:4 | 198.9 |
| MK-3 | Nov. 15, 2019 | 75/25 | 0.75 | 4M 1:4 | 186.9 |
| MK-4 | Nov. 15, 2019 | 75/25 | 1 | 4M 1:4 | 193.3 |
| MK-5 | Nov. 16, 2019 | 75/25 | 27 | 4M 1:4 | 206.2 |
| MK-6 | Nov. 18, 2019 | 75/25 | 59 | 4M 1:4 | 216.4 |

The solution was acidified with nitric acid. The low pressure reactor was used to process larger amounts of fly ash (e.g., 250 g per batch) to produce larger amounts of ash for REE recovery experiments. The leachate from the hydrothermal treatment was analyzed by inductively coupled plasma-mass spectrometry (ICP-MS) to determine exact concentration of REEs and other trace metals mobilized. These experiments provided the feed solution for separation and concentration of REEs.

Hydrothermal experiments successfully demonstrated the feasibility of extracting >300 ppm T-REE (mg REE extracted per kg ash) from fly ash. After an acidification step, which acted as the feed solution for the ligand-associated media concentration process, the hydrothermal solution pH was dropped to pH<0 with nitric or hydrochloric acid to mobilize REEs, followed by a pH increase to precipitate Fe and modify pH to ~3 for effective sorption with the ligand-associated media. The acidified hydrothermal leachate solution was injected through columns of the ligand-associated media.

Select/Characterize Ligands

Figure 2:
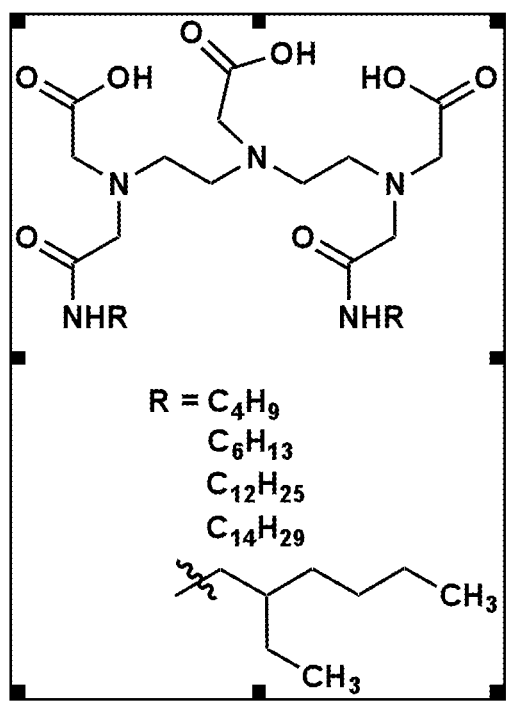
FIG. 2 shows a generalized structure for a modified ligand-associated media.
Figure 3:
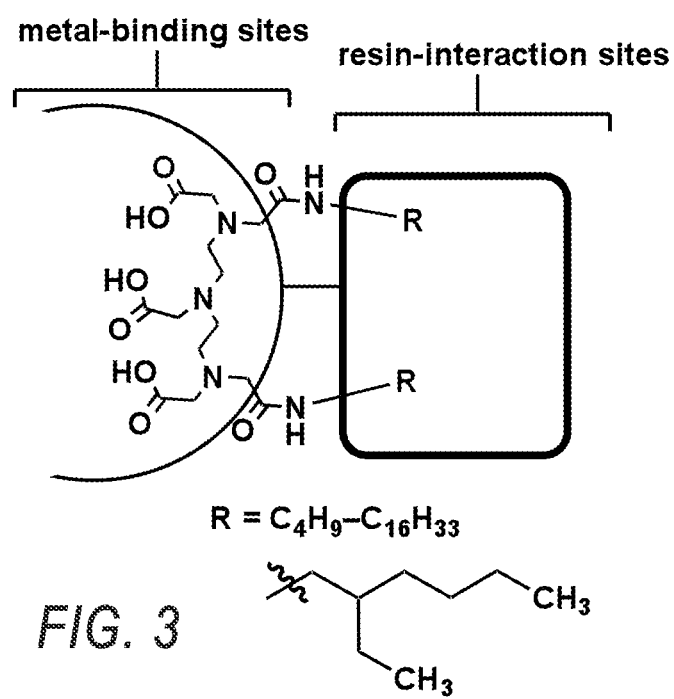
FIG. 3 shows the mechanics of the modified ligand-associated media interacting with the resin solid support and binding with REEs.

After leaching, the dissolved REEs in the hydrothermal leaching liquid needed to be extracted and concentrated. To do so, an organosilica-based adsorbent (e.g., Osorb) that has an extremely high capacity for organics was used. Ligands used in the project were characterized using $^1H$ nuclear magnetic resonance (NMR) and high resolution mass spectrometry (HRMS) techniques. One such ligand was diethylenetriaminepentaacetic acid (DTPA). FIG. 2 shows a generalized structure for a modified ligand-associated media where the ligand is DTPA chemically associated with hydrophobic groups represented by R, wherein R equals $C_4H_9$, $C_6H_{13}$, $C_{12}H_{25}$, $C_{14}H_{29}$, or $C_{16}H_{33}$. FIG. 3 shows the mechanics of the modified DTPA-associated media, wherein the two hydrophobic groups R anchor the ligand to the media (e.g., organosilica) through hydrophobic interactions, leaching three carboxylic groups to drive pH-responsive metal binding with REEs. Table 2 shows details of the characterization for different DTPA (ligand) molecules that were synthesized.

TABLE 2

Various DTPA molecules and characterization techniques used.

| Ligand | HRMS | $^1H$ | $^{13}C$ | HMQC | DEPT | COSY |
|---|---|---|---|---|---|---|
| bis(4NH$_2$) DTPA[1] | ✓ | ✓ | ✓ | ✓ | ✓ | ✓ |
| bis(6NH$_2$) DTPA | ✓ | ✓ | | | | |
| bis(EHNH$_2$) DTPA[2] | ✓ | ✓ | ✓ | ✓ | ✓ | ✓ |
| bis(12NH$_2$) DTPA | ✓ | ✓ | | | | |
| bis(14NH$_2$) DTPA[3] | ✓ | | | | | |
| bis(16NH$_2$) DTPA[3] | ✓ | | | | | |

Characterization of DTPA derivatives was performed using a suite of techniques to assign identity and purity. HRMS was used to characterize identity of ligands and NMR spectroscopy was used to characterize the purity of ligands. HRMS involves the ionization of a sample and subsequent detection of ions of interest. Proton ($^1H$)-NMR spectroscopy uses a magnetic field to obtain a spectrum of unique and characteristic peaks exhibiting different chemical shifts with different intensities and splitting patterns. The shifts of the peaks are telling of the environment in which the corresponding protons are located, the area under the peak is telling of how many protons are represented by the peak, and the splitting patterns is informative of the number of nearby protons. Carbon ($^{13}C$)-NMR spectroscopy identifies the environment in which carbon atoms on a compound are located based on chemical shift. To fully characterize the ligands, Heteronuclear Multiple Quantum Coherence (HMQC) NMR spectroscopy, Distortionless Enhancement by Polarization Transfer (DEPT) NMR spectroscopy, and Correlated Spectroscopy (COSY) NMR spectroscopy were used. HMQC plots the $^1H$-versus $^{13}C$-spectra and is used to correlate which protons are attached to which carbons in a compound. DEPT is used to report which carbon atoms are primary, secondary, and tertiary. COSY plots $^1H$ versus $^1H$ and is used to analyze which protons are near other protons through bonds. Together, HMQC, DEPT, and COSY can be used to unambiguously assign $^1H$- and $^{13}C$-NMR spectra analysis of purity. For ligands that have been previously reported, it is acceptable to match NMR peaks and integrations to the reported values to assess purity. All six of the DTPA ligands in Table 2 were pure to the detection limit of NMR spectroscopy. The full suite of NMR was obtained for ligands bis(EHNH$_2$) DTPA and bis (4NH$_2$) DTPA for extra measure. Ligands that do not have both identity and purity forms of characterization were omitted from further studies because their limited solubility prevented characterization using the techniques described above.

Three ligands were initially selected and are illustrated in FIG. 5. Two of the ligands are commercially available: dipentyl pentylphosphonate and P,P'-di(2-ethylhexyl)methanediphosphonic acid (DIPEX) and contain the phosphonate and diphosphonic acid functional groups that are known to bind to REEs and contain hydrophobic moieties that are expected to facilitate capture by the organosilica (e.g., Osorb).

The third type of ligand is based on DTPA. DTPA demonstrates the ability to bind to lanthanides, and its derivatives rapidly dissociate under acidic conditions. This property is ideal for releasing trapped lanthanides after extraction into the organosilica (e.g., Osorb). To enable DTPA to interact with the organosilica, the DTPA was functionalized with hydrophobic groups (modified DTPA). Pursuant to an implementation, DTPA was synthetically modified to include two hydrophobic ethylhexyl groups to form bis(ethylhexyl)amido DTPA. The structure and design features of bis(ethylhexyl)amido DTPA are shown in FIG. 4. The bis(ethylhexyl)amido DTPA was prepared using ethylhexylamine and diethylenetriaminepentaacetic acid bis-anhydride. A solution of ethylhexylamine (4.39 g, 0.0340 mol) in anhydrous dimethylformamide (50 mL) under an atmosphere of argon was heated to 70° C. Diethylenetriaminepentaacetic acid bis-anhydride (6.02 g, 0.0168 mol) was added to the solution while stirring. The reaction was stirred for 4 h at 70° C. Solvent was removed, and the resulting light-yellow oil was solidified by adding acetone (30 mL). The solid was recrystallized from boiling ethanol to yield 6.58 g (79%) of the desired product as a white microcrystalline solid.

Figure 6:
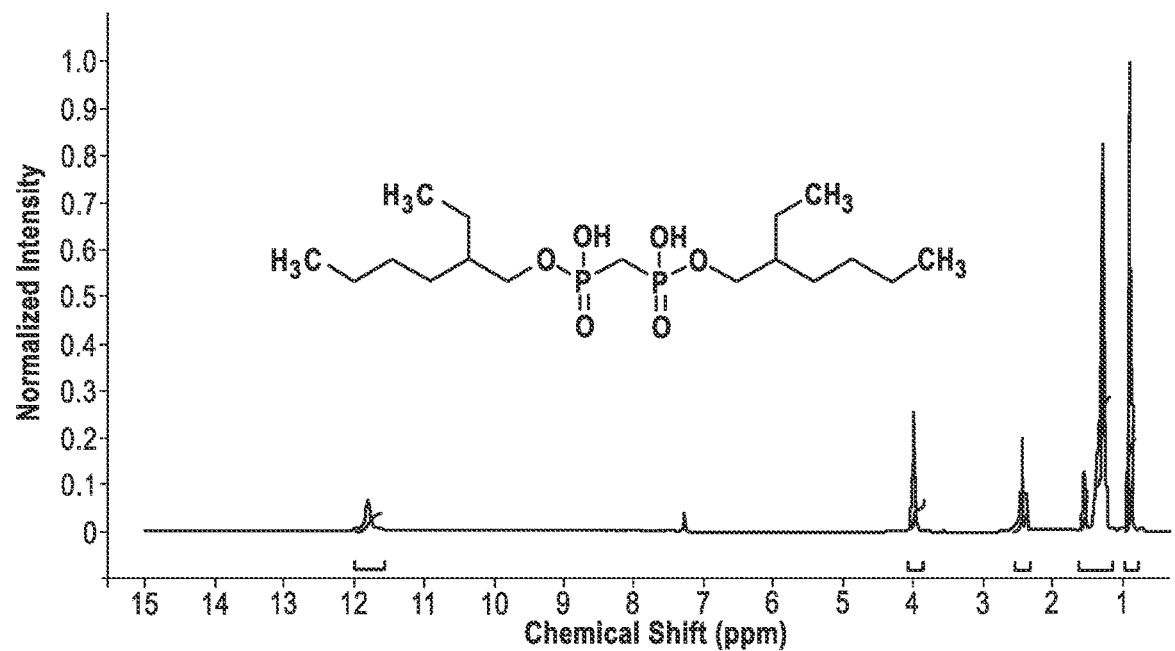
FIGS. 6 and 7 are graphic illustrations of $^1$H NMR spectra for ligands according to teachings of the present disclosure.
Figure 7:
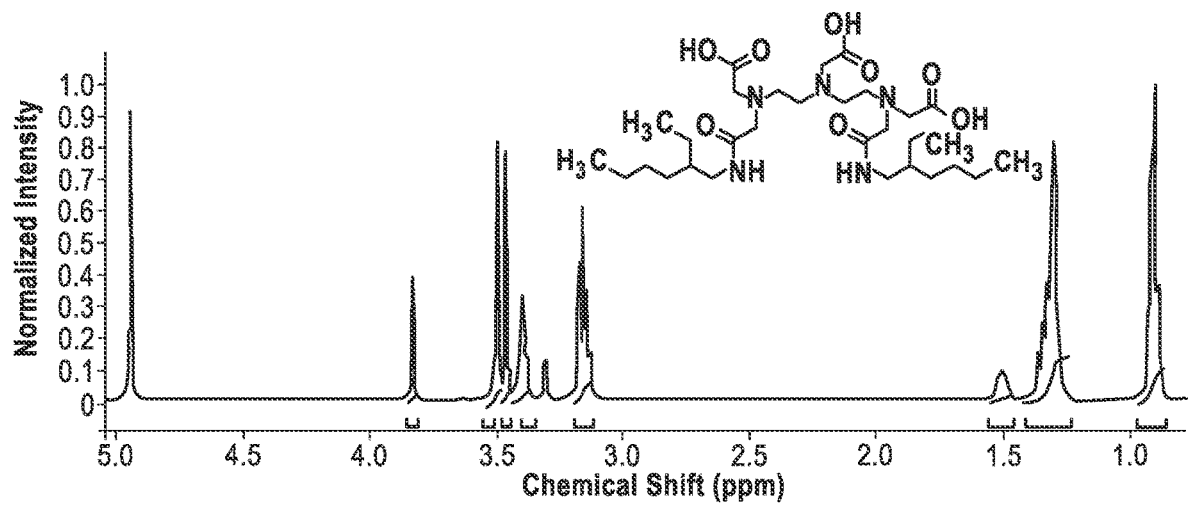

The commercially available DIPEX ligand was characterized using $^1H$ nuclear magnetic resonance (NMR) and peaks have been assigned based on spectra as illustrated in FIG. 6, whereas the bis(ethylhexyl)amido DTPA is shown in FIG. 7. Bisamyl amylphosphonate, bis(2-butylamido) DTPA, bis(2-hexylamido) DTPA, bis(2-ethlyhexyl)amido DTPA, and bis(2-dodecyclamido) DTPA have all been synthesized and confirmed through NMR ($^1H$ and 2D) and LC-MS.

To summarize, analytical methods (NMR and LC-MS) were used to ensure that two commercial ligands are >95% pure to identify. The commercially available DIPEX ligand and bisamyl amylphosphonate (DTPA) where characterized for identify and purity using NMR and LC-MS. Peaks have been assigned based on published spectra and confirm the identity and purity (lack of unidentified peaks) for both DIPEX (FIG. 6) and modified DTPA (FIG. 7).

Load Ligands to Organosilica Platform

FIG. 8 illustrates a process 800 for loading ligands to make a modified ligand-associated media. At step 805, the selected ligand, e.g., DTPA functionalized with hydrophobic groups (e.g., alkyamines) to form modified DTPA, is dissolved into a suitable solvent (e.g., methanol). At step 810, the ligand solution is then combined with solid support (e.g., loaded to an organosilica platform) and rotated (e.g., at 15-50 rpm) for a sufficient time (e.g., 1-5 hours) to allow for association. At step 815, the solvent is then removed by evaporating the methanol using a vacuum centrifuge. At step 820, the ligand-associated media is dried and stored for use.

For the bis(ethylhexyl)amido DTPA-associated organosilica, the sorbent was synthesized by attaching the hydrophobic ethylhexyl chains of the ligand to the hydrophobic organosilica, leaving three carboxyl groups to interact with aqueous cations. A swellable organically modified silica, or organosilica, was used as the hydrophobic solid support. Before modification, the organosilica had a reported surface area of >600 m2/g (BET N2 method), a pore volume of 0.65 mL/g, and an average pore size <6 nm. Batches of organosilica media (4.03±0.01 g) were loaded with bis(ethylhexyl) amido DTPA by adding solutions of bis(ethylhexyl)amido DTPA (50 mL, 32.6±0.1 mM) in methanol to the organosilica in 50 mL screw-top polypropylene centrifuge tubes. The suspensions were rotated at 19 revolutions per minute for 1 h at ambient temperature. Methanol was removed (Vacufuge Concentrator 5301) at 45° C. for approximately 3 h to visible dryness. Portions of purified water (3×40 mL) were used to rinse the media. The ligand-associated media was filtered using a Buchner funnel, filter paper (Qualitative 90 mm, Whatman), and water-aspiration vacuum filtration. The media was returned to the vial and residual solvent was removed under reduced pressure.

Ligand reaction time, attachment strength, and product stability were investigated. The three ligands described above (dipentyl pentylphosphonate, DIPEX, modified DTPA) were loaded to the organosilica platform (e.g., Osorb) in small batches by the process 800 described above. The measurable outcome was to achieve surface coating of 50% by weight with the first two ligands (DIPEX and DTPA derivative). Surface loadings were measured by NMR quantifying the concentration of ligand in the initial and final solutions, and the % by weight loading was calculated by normalizing to the mass of organosilica used.

Figure 9:
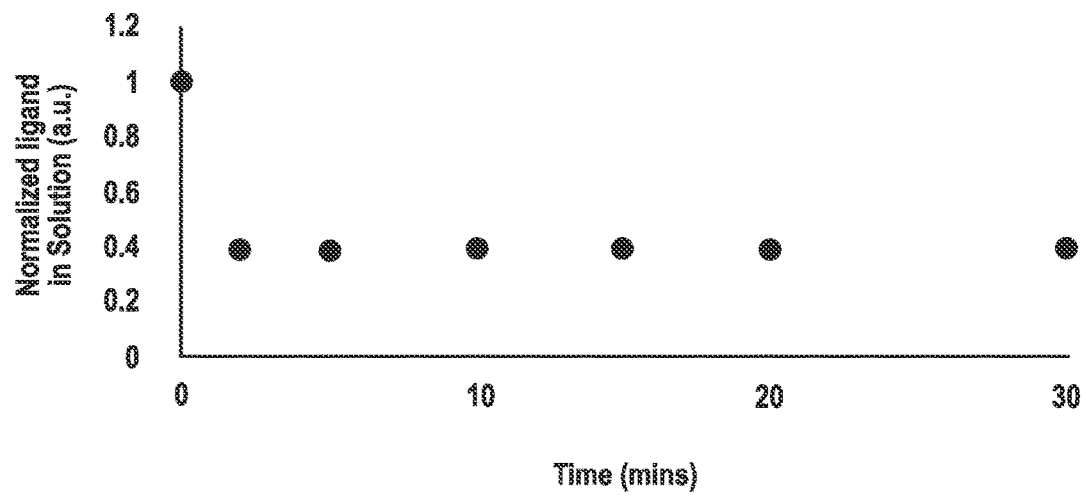
FIG. 9 is a graphic illustration of $4NH_2$ DTPA sorption attachment kinetics to organosilica measured via NMR according to teachings of the present disclosure.

As illustrated in FIG. 9, which illustrates 4NH$_2$ DTPA sorption attachment kinetics to organosilica measured via NMR, ligand association occurs in less than 3 minutes, which enables rapid production of the media.

Figure 10:
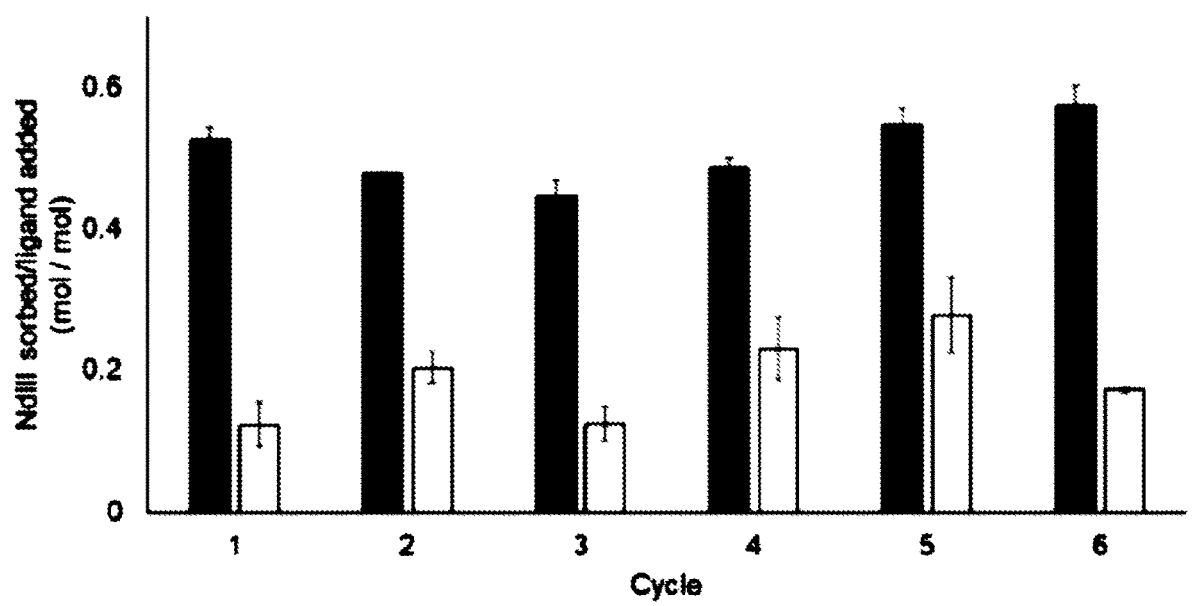
FIG. 10 is a graphic illustration of efficiency of cycling pH for sorption and desorption of $Nd^{III}$ from the organosilica-ligand system according to teachings of the present disclosure.

Batch experiments were conducted to test the recovery of sorbed REE from the DTPA and the stability of the media for reuse through cycling the pH from 3.3 (loading) and 1.5 (release). FIG. 10 illustrates the efficiency of cycling pH for sorption and desorption of $Nd^{III}$ from the organosilica-ligand system (e.g., bis(ethylhexyl)amido DTPA-associated organosilica). The black bars represent $Nd^{III}$ bound between pH 3.17 and 3.53, and white bars represent $Nd^{III}$ bound between pH 1.45 and 1.61. Error bars indicate the standard error of the mean of three independently prepared samples. As seen in FIG. 10, more metal binds at the higher pH than at the lower pH for each cycle. From this cycling experiment, a clear trend of binding $Nd^{III}$ at a mildly acidic pH and eluting $Nd^{III}$ at lower pH is apparent. Furthermore, the media does not demonstrate a significant decrease in the binding efficiency between the first and sixth cycles, suggesting that the ligand-associated media has the potential for many rounds of reuse.

Successful Test of Ligand-Organosilica System with 2 Commercial Ligands

The dissolved REEs in the hydrothermal leachate needed to be concentrated for purification. This would involve sorbing the REEs to the ligand-organosilica media. Colum and batch experiments were conducted.

Batch Experiments—Synthetic Solution

DIPEX and Dipentyl Pentylphosphonate Experiments

Figure 11:
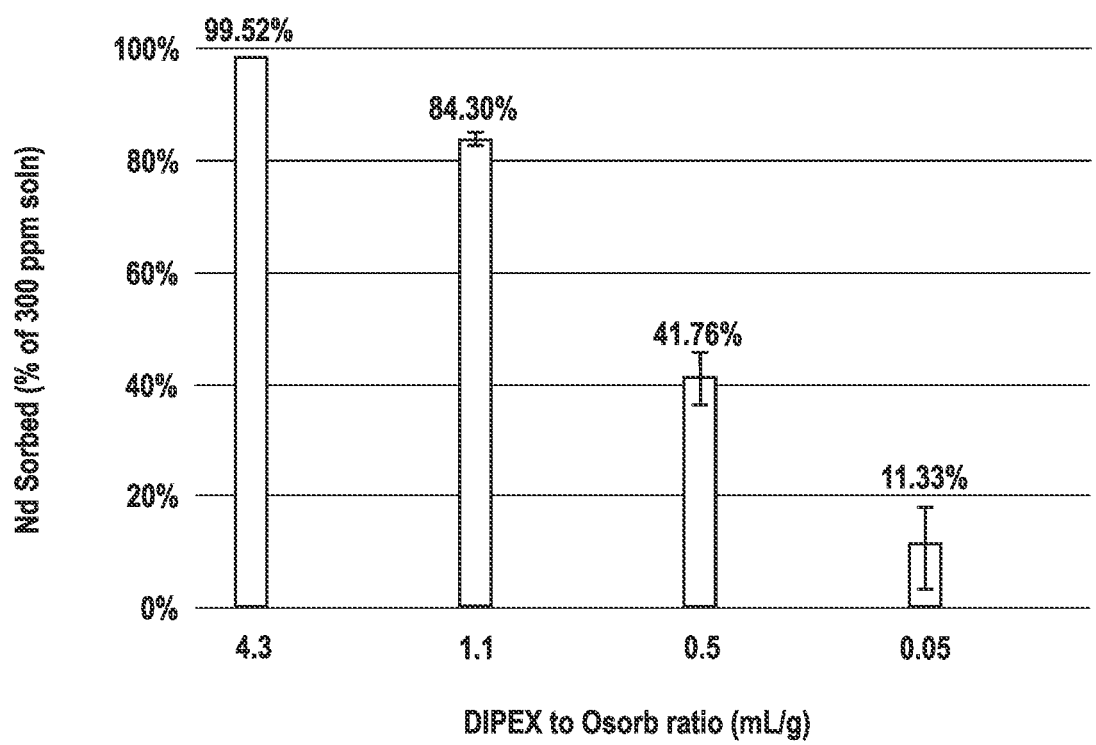
FIG. 11 is a graphic illustration of $Nd^{III}$ sorbed from 40 mL of 300 ppm $Nd^{III}$ solution (pH ~2) after 24 h for 4 different DIPEX to Osorb ratios according to teachings of the present disclosure.

The two commercial ligands were first tested for $Nd^{III}$ sorption as an analog for total REE sorption. The results confirm the expected result that higher DIPEX loading ratios result in higher Nd sorption. The highest surface loading of DIPEX (4.3 mL/g, or ~4.3 g DIPEX/g organosilica based on a density ~1 g/mL for DIPEX) has yielded 99.5% removal of a 300 ppm Nd solution at pH 2, as seen in FIG. 11S, which illustrates Nd sorbed from 40 mL of 300 ppm Nd solution (pH ~2) after 24 h for 4 different DIPEX to organosilica ratios. Loadings shown are 4.3×, 1.1×, 0.5×, and 0.05×, which correspond to 430 wt %, 110 wt %, 50 wt %, and 5 wt % loading, respectively. Dipentyl pentylphosphonate media exhibited very little sorption of Nd and was removed from further consideration.

The next step was to compare DTPA- and DIPEX-associated resin performance to select the ligand that would be used in column experiments. It was determined that, for $Nd^{III}$ recovery with acidic solution, although DIPEX has a large capacity for sorbing REEs, the sorbed REEs are difficult to recover, even with concentrated acid.

Batch sorption experiments were conducted with solutions of 16 REEs (2.5 ppm each) with various mass loadings in 40 mL of pH 2 nitric acid solutions. While DIPEX media has a large capacity for REEs, DTPA media shows selectivity for the mid to heavy REEs while showing minimal sorption of La and Ce. Further, although DIPEX media has a large capacity for sorption, DTPA media shows a selectivity for mid-to-heavy REEs over light REEs.

Figure 12A:
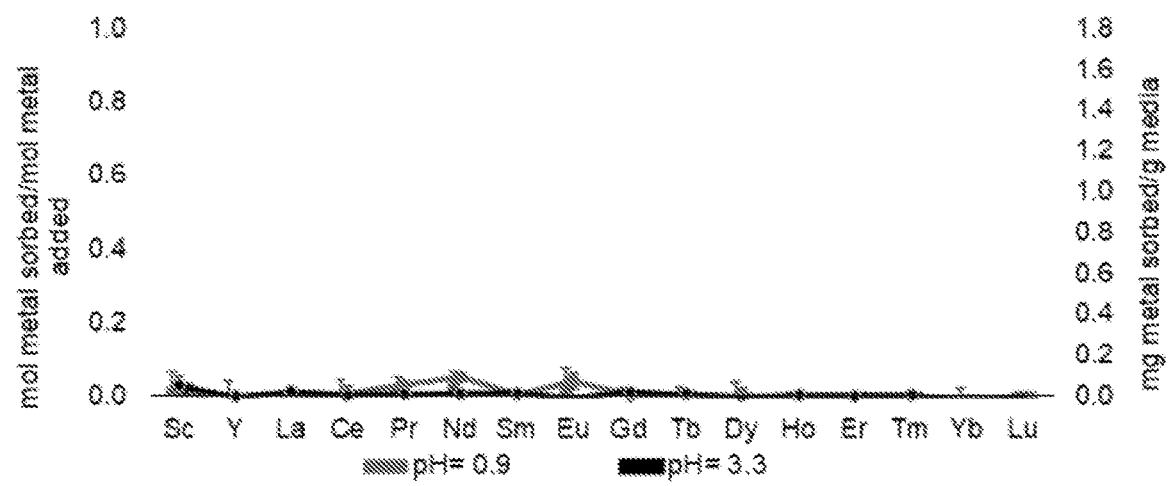
Figure 12B:
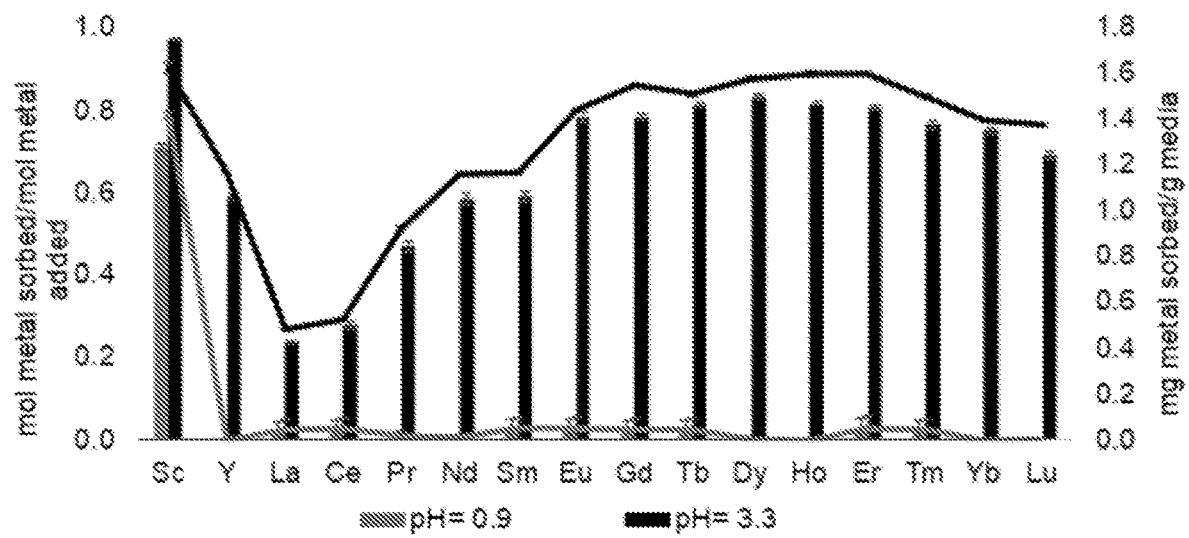

FIGS. 12A and 12B shows batch sorption experiments with 16 REEs at pH 0.9 and pH 3.3 with unmodified organosilica (FIG. 12A) and bis(ethylhexyl)amido DTPA-associated organosilica (FIG. 12B). The unmodified media shows little to no sorption of rare-earth elements at both high and low pH (FIG. 12A). Ligand-associated media shows preference for binding the mid to heavy REEs, e.g., binds 6 and 130 times more rare-earth elements than unmodified media at pH 0.9 and 3.3, respectively, at these concentrations (FIG. 12B). With reference to FIG. 12B, at pH 0.9, the sorption of all rare-earth elements excluding scandium is insignificant. Metal sorption increases significantly at pH 3.3, where a total of 0.69 mol of rare-earth elements are extracted per mol of added metal (21 mg rare-earth elements per g of media). At pH 0.9, only 0.13 mol rare-earth elements per mol of added metal are extracted (1.6 mg metal per g media), with scandium accounting for 76% of the total bound metal at the lower pH. The solution at pH 3.3 shows notable selectivity of binding heavy over light rare-earth elements with lanthanum and cerium exhibiting the lowest sorption overall. Because only $Sc^{III}$ binds to the ligand-associated media at pH 0.9, the selectivity for $Sc^{III}$ presents an opportunity to remove $Sc^{III}$ at a low pH with ligand-associated media prior to exposing solutions to ligand-associated media at higher pH.

Figure 13:
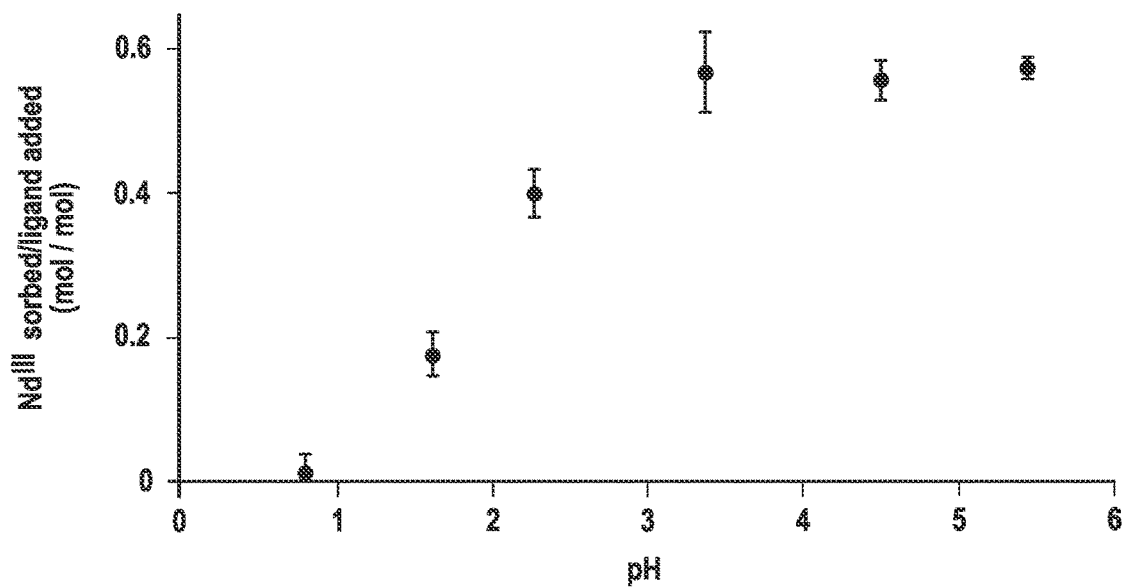
FIG. 13 is a graphic illustration of $Nd^{III}$ sorption as a function of pH according to teachings of the present disclosure.

Based on the observed selectivity and the pH, the modified DTPA-associated media was selected as the sorption media candidate studied for the remainder of the project. The pH dependence of $Nd^{III}$ sorption was also tested due to the critical nature of neodymium in many technologies, and it was found that maximum sorption occurs above pH 3.3, as seen in FIG. 13, which illustrates $Nd^{III}$ sorption as a function of pH. Six solutions of $Nd^{III}$ (300 ppm) in dilute nitric acid (<0.2% v/v) were prepared within a range of pH (0.8-5.4). The amount of metal sorbed after 1 h was calculated. Error bars indicate the standard error of the mean of three independently prepared samples. As shown in FIG. 13, an insignificant amount of metal binding at pH 0.8 was observed (<0.01±0.03 mol $Nd^{III}$ sorbed per mol of added ligand). As the pH increases, the ligand-associated media sorbed more metal per mole of added ligand, reaching a plateau at pH 3.4±0.1 with 0.57±0.06 mol $Nd^{III}$ sorbed per mol of added ligand. This observation is consistent with the pH-dependence of DTPA complexation where the metal binding sites (carboxylic acids and amines) are largely protonated below pH 2.

Batch Experiments—Fly Ash Leachate

Figure 14:
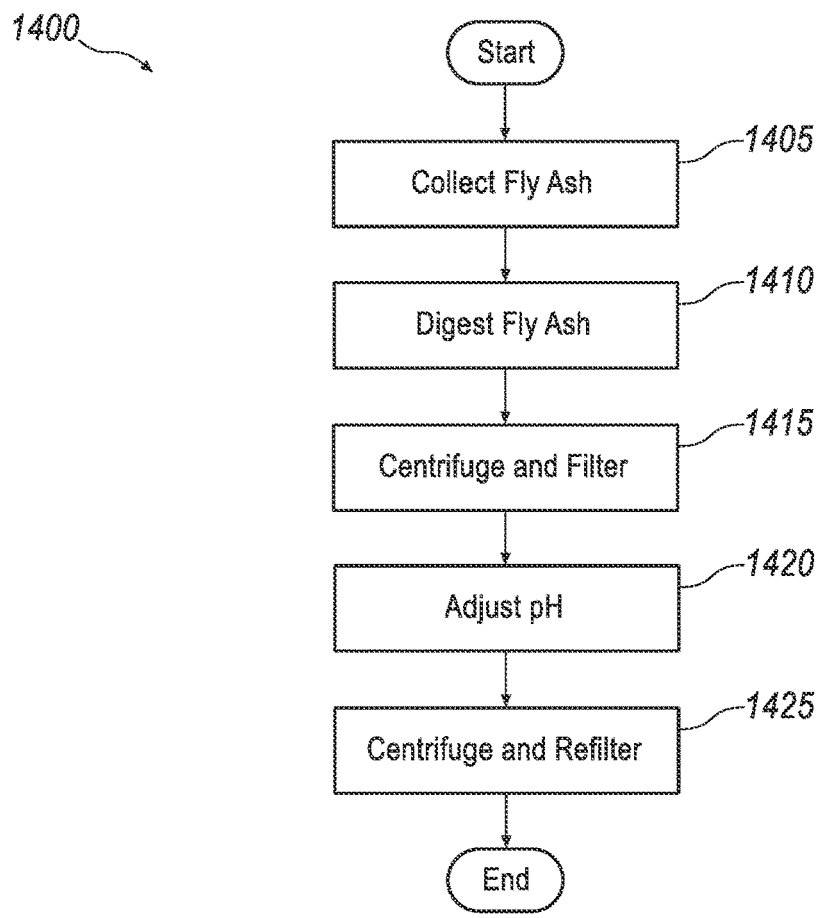
FIG. 14 illustrates an exemplary process for fly ash digestion according to teachings of the present disclosure.

To evaluate the potential of using the modified DTPA-associated media for rare-earth element extraction from a more complex solution, tests on the ligand-associated media sorption were performed with coal fly ash digestion leachate in a nitric acid system raised to pH 3 for sorption experiments. In addition to coal fly ash being an abundant waste product with significant amounts of rare-earth elements, fly ash leachates contain large concentrations of competing trivalent ions such as aluminum and iron. The process 1400 is illustrated in FIG. 14. At step 1405, ash is collected. At step 1410, the ash is digested, e.g., using 4M HCl, 1:6 solid to liquid ratio. At step 1415, the solution is centrifuged (30 minutes, 3500 rpm) and filtered. At step 1420, NaOH (aqueous, 8M) is added to increase pH (e.g., 0.5 to ~3). At step 1425, the resulting solution was centrifuged (30 min, 3500 rpm) and filtered a second time, and the resulting leachate was ready for injection through column. Nearly 90% of the Fe is removed by increasing the leachate pH from 0.03 to 3.4, while retaining nearly 60% of the REE content in solution (with Sc preferentially precipitating >85%). This solution is then filtered by various means (e.g., centrifuge, syringe filter, Buchner funnel). The resulting leachate solution (an example of a low yield sample of ~26 ppm REE) was then used in batch and column experiment, as seen in Table 3, which shows metal concentrations of fly ash leachate measured by ICP-MS. Reported values are the mean concentration of three replicates plus or minus standard error of the mean.

TABLE 3

Metal concentrations of fly ash leachate measured by ICP-MS

| Element | Concentration (ppm) |
|---|---|
| Al | 5500 ± 100 |
| Sc | 0.82 ± 0.03 |
| Fe | 1800 ± 50 |
| Ni | 4.2 ± 0.20 |
| Y | 4.2 ± 0.04 |
| La | 4.1 ± 0.05 |
| Ce | 8.2 ± 0.10 |
| Pr | 1.0 ± 0.01 |
| Nd | 3.7 ± 0.04 |
| Sm | 0.78 ± 0.01 |
| Eu | 0.19 ± 0.002 |
| Gd | 0.82 ± 0.01 |
| Tb | 0.13 ± 0.002 |
| Dy | 0.76 ± 0.01 |
| Ho | 0.15 ± 0.001 |
| Er | 0.43 ± 0.001 |
| Tm | 0.06 ± 0.0009 |
| Yb | 0.37 ± 0.01 |
| Lu | 0.06 ± 0.0004 |

Figure 15:
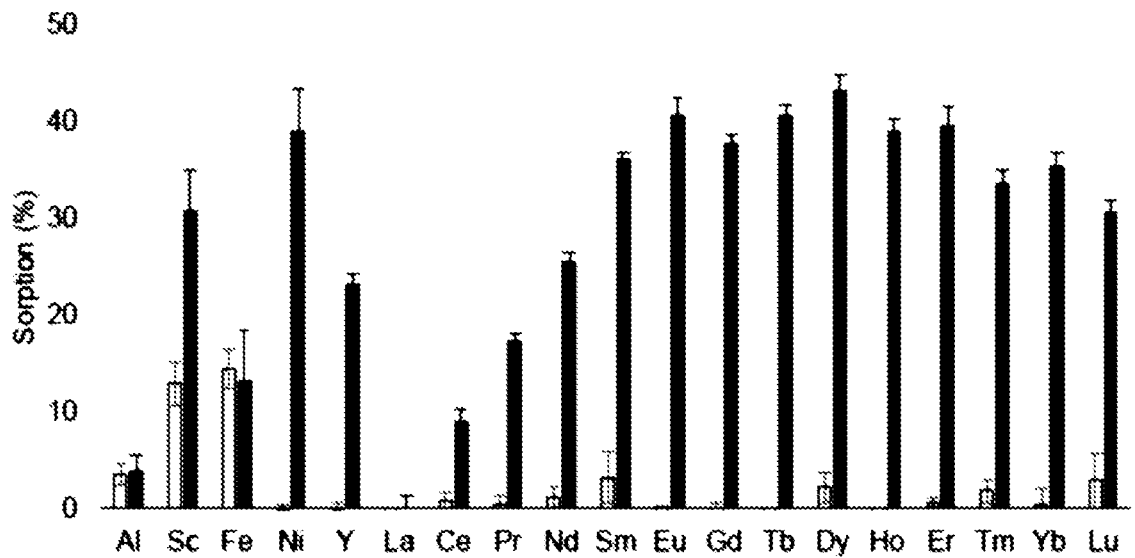
FIG. 15 is a graphic illustration of metal sorption from fly ash leachate solutions at pH 3.0 according to teachings of the present disclosure.

Batch sorption experiments were conducted with the DTPA media and fly ash leachate. FIG. 15 illustrates metal sorption from fly ash leachate solutions at pH 3.0. Hollow bars for each element represent percent metal extracted with unfunctionalized media at pH 3.0, and black bars for each element represent metal extracted with the ligand-associated media. Error bars represent the standard error of the mean of three independently prepared samples. Modified DTPA media shows selectivity for med and heavy REEs while showing minimal sorption of La and Ce, even in the presence of large concentrations of Al and Fe. At these concentrations, the unmodified organosilica only sorbed Al, Fe, and Sc, while all other rare-earth elements and nickel did not significantly sorb. These experiments demonstrate that sorption of rare-earth elements to ligand-associated media occurs as a result of the modification with hydrophobic bis(ethylhexyl)amido DTPA. Interestingly, these data also suggest that the unmodified organosilica could be used as a means to pretreat samples to remove iron or aluminum or to select for scandium among the other rare-earth elements at these concentrations.

Column Experiments—Synthetic Solutions

Figure 16:
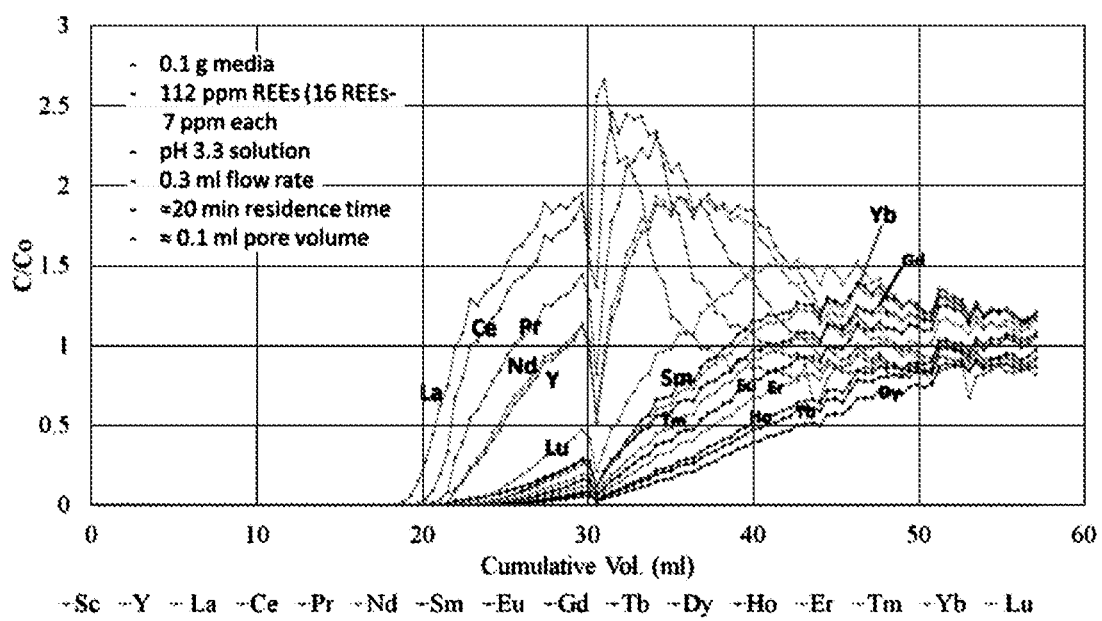
FIG. 16 is a graphic illustration of results from column breakthrough experiments with 112 ppm REEs (16 REEs with 7 ppm total) with synthetic solution (no cations other than REEs) according to teachings of the present disclosure.

Competitive sorption column breakthrough experiments: The same solutions as were used in the batch experiments (16 REEs; 2.5 ppm each; pH 2) have been tested in columns with 0.075 g of the DTPA media and a flow rate of 0.2 mL/h. The selectivity behavior that was observed in the batch experiments has been confirmed in the column experiments. The DTPA media has the highest affinity for mid to heavy REEs and lowest affinity for light REEs (e.g., Ce and La). In a fixed bed column, our media can sorb >99% of REEs present in synthetic leachates. FIG. 16 illustrates column breakthrough experiments with 112 ppm REEs (16 REEs with 7 ppm total) with synthetic solution (no cations other than REEs). The graph of FIG. 16 has normalized concentration (C/Co) on the x-axis.

Column Experiments—Fly Ash Leachate Solutions

Digestion solution (Table 3) was pumped through two columns packed with modified DTPA-associated media (15 cm×1 cm) and effluent was collected in a fraction collector and analyzed for metal and REE concentrations via ICP-MS. The solution was pH ~3. After REEs were concentrated on sorbent, 0.5 pH HCl was injected to strip sorbed REEs (results in pH 0.5 solution enriched with REEs).

One pore volume (PV) represents the void space in the 15 cm×1 cm column and was 5.9 mL (or 0.0059 L). The column achieved >95% sorption for the first 17.7 PV (104 mL) for T-REE and 32.8 PV (193 mL) for T-REE minus Ce and La. Had the column been stripped at 17.7 PV and cycled a second time, 95% of the REEs would have been retained in the column. The column was loaded until 597 mL (or 101 PV) of leachate had passed through the column. This was to test the maximum capacity of the media for REE sorption with the leachate.

Column experiments showed significant REE sorption (with preference for "heavy" over "light" REEs). First, all REEs in solution are sorbed due to an excess of available binding sites. As binding sites are filled, additional heavier REEs (e.g., Dy, Lu) replace light REEs (e.g., La, Ce).

REE accumulation of sorbed REEs in the column (in mg) were measured, as 500 mL of fly ash leachate is injected in the first cycle. Next, ~200 mL of 0.5 pH HCl was injected next to strip the sorbed REEs. >90% of the sorbed REEs were released in the first 5 pore volumes. The first sample had a concentration of >500 ppm REE in solution. A second cycle (injection and stripping) shows that the system can be reused.

Evaluate REE Recovery from Ligand-Organosilica Media

The sorbed REEs are extracted from the solid phase, and then converted to their oxide form.

After REEs were concentrated on the column media (e.g., from 500-600 mL of solution) as described above, hydrochloric acid solution (pH 0.5) (e.g., ~200 mL) was pumped through to release sorbed REEs. Over 90% of the sorbed REEs were released in the first 5 pore volumes. The first sample had a concentration of >500 ppm REE in solution. A second cycle (injection and stripping) shows that the system can be reused.

The fraction collector tubes that contained >90% of the sorbed REEs were then subjected to an oxalic acid precipitation and filtration. Oxalic acid (e.g., 5.36 g) was added to 20 mL of concentrated REE solution (217.6 ppm) and the precipitate was filtered and transferred to a crucible for calcination. A second oxalate precipitation was then conducted by adding oxalic acid (e.g., 3.32 g) to the remaining release solution. Crucibles were transferred to a muffle furnace and calcined at 750° C. for 3.5 h to convert oxalate salts to REOs. The final powders were weighed and acidified to measure the REE content, and the REE content was converted to REO equivalent. 76.5 mg of powder with 5.25±0.20 g of T-REE was recovered from the first precipitation and 4.13 mg of powder with 0.564±0.0007 g T-REE from the second precipitate with REO content of 6.86±0.25 wt % and 13.66±0.02 wt %, respectively. Table 4 illustrates results from REO calcination. Average and standard deviation are for % wt of REEs.

TABLE 4

Results from REO calcination.

|  | Total REEs oxides (mg) | % of REEs oxides in the powder | Average | St. Dev |
|---|---|---|---|---|
| Sample-1A | 5.110 | 6.681 | 6.863 | 0.258 |
| Sample-1B | 5.389 | 7.045 | | |
| Sample-2A | 0.565 | 13.676 | 13.664 | 0.017 |
| Sample-2B | 0.564 | 13.652 | | |

Develop Surface Complexation Model of Ligand-Organosilica-REE System and Evaluate Sorption Mechanisms Anions and cations present in the fly ash extraction solution were quantified by ion exchange chromatography and inductively coupled plasma mass spectrometry (ICP-MS). Using the mean concentration from these results and a measured solution pH of 3.38, geochemical modeling was performed using PHREEQCi (Version 3.6.2) using the Lawrence Livermore National Laboratory thermodynamic database (llnl.dat 12758, from thermos.com.v8.R6.230).

Initial results had a charge balance of 4.36% and reported 1,331 species for 49 elements. This model includes different oxidation states, which is critically important to characterize speciation of many metal species (e.g. iron) and potential inorganic ligands (e.g. phosphorus). One important decision for speciation modeling is to select a model for calculating activity coefficients. Well known equations such as the Davies' and Extended Debye-Huckel utilize an ion-association model that can lead to significant errors at higher ionic strengths >2 molal. The extraction solution modeled was 2.3 molal. One approach to modeling the high ionic strength extraction solution is to use a reaction model (PHRQPITZ) that relies on fitting of mixed electrolyte solutions to describe speciation at high ionic strengths (>2 molal). Although technically more accurate, PHRQPITZ is limited in the number of fitting parameters currently available and cannot describe redox speciation.

One of the main sources of interference in the extraction solution that could inhibit the isolation of REE is the presence of high concentrations of iron (~720 mg/L).

Based on results from the model runs, removing this interference may be accomplished by shifting between a reducing and oxidizing environment. Under oxidizing conditions, iron precipitates out around a pH of 4 while under reducing conditions, iron stays in solution until a pH of 8. Neodymium begins to precipitate out of solution around a pH of 3 and theoretically stays in solution beyond a pH of 8 in oxidizing conditions. By simply aerating the extraction solution, it may be possible to remove the iron interference prior to isolating neodymium and other REE.

Neodymium speciation in extraction solution at pH of 3.38 are shown in Table 5.

TABLE 5

>99% of total Nd is present in the 7 species.

| Species | Molality | % of total Nd |
|---|---|---|
| $NdCl_2^+$ | 1.07E−05 | 45.0 |
| $Nd^{3+}$ | 9.74E−06 | 41.0 |
| $NdSO_4^+$ | 1.47E−06 | 6.2 |
| $NdCl_2^+$ | 1.22E−06 | 5.2 |
| $NdCl_3$ | 4.07E−07 | 1.7 |
| $NdCl_2^-$ | 2.28E−07 | 1.0 |

At a pH of 3.38, phosphate minerals are thermodynamically favored (Table 6), while all other minerals are well below their solubility limit.

TABLE 6

Example of 7 selected Nd species that are supersaturated in the fly ash leachate.

| Mineral Phase | Saturation Index |
|---|---|
| Nd | −135.39 |
| $Nd(OH)_3$ | −14.21 |
| $Nd(OH)_{3(am)}$ | −16.61 |
| $Nd(OH)_{3(c)}$ | −11.91 |
| $Nd_2O_3$ | −50.78 |
| $NdF_3:0.5H_2O$ | −14.37 |
| $NdPO_4:10H_2O$ | 0.56 |

It should be appreciated that the specific measurements, concentrations, and the like described above were for the experiments and are not intended to be limiting in any way.

From the above, an exemplary process for solid-liquid extraction of REEs from fly ash or e-waste may include preparing a coal fly ash leachate or an electronic waste leachate; forming a modified ligand-associated media; injecting the fly ash leachate or the e-waste leachate through the modified ligand-associated media so that rare earth metals (REEs) in the fly ash leachate or the e-waste leachate sorb to the ligand-associated media; and extracting the sorbed REEs.

The fly ash leachate or the e-waste leachate may be obtained by performing a hydrothermal dissolution process on the sample of fly ash or e-waste. The hydrothermal dissolution process may include at least one of the following techniques: (1) flow through column; (2) high temperature Parr reactor vessels; and (3) low temperature reactor.

The hydrothermal dissolution process may include pumping a carbonate (e.g., sodium carbonate) through a column of the fly ash or e-waste; extracting altered ash or e-waste from the column; acidifying the altered ash or e-waste with a concentration of an acid (e.g., nitric acid or hydrochloric acid); raising the pH of the ash or e-waste concentration (e.g., by adding sodium hydroxide); and filtering the ash or e-waste concentration to obtain the fly ash leachate or e-waste leachate.

The fly ash leachate or the electronic waste leachate may be injected through the ligand-associated media by mixing the fly ash leachate or the electronic waste leachate with the ligand-associated media in a solution with a pH of 1-5, preferably with a pH between 3 and 3.6 to facilitate sorption of the mid to heavy REEs.

Forming the ligand-associated media may include dissolving the modified ligand in a solvent (e.g., methanol) to form a ligand solution; combining the ligand solution with a solid support (e.g., an organosilica platform); allowing time for association (e.g., rotating the combined ligand solution and solid support for a set period of time (e.g., 24 hours)); and removing the solvent to result in the ligand-associated media (e.g., via a vacuum).

Extracting the sorbed REEs may include pumping a hydrochloric acid solution through the sorbed fly ash leachate or e-waste leachate to release the sorbed REEs. The process may then include converting the extracted REEs to rare earth oxides (REOs). This may be done by adding oxalic acid to form a precipitate; filtering the precipitate; and calcinating the filtered precipitate.

The ligand may be commercially available ligands, including, but not limited to, dipentyl pentylphosphonate or P,P'-di(2-ethylhexyl) methanediphosphonic acid (DIPEX).

Alternatively, the ligand may also be diethylenetriaminepentaacetic acid (DTPA) functionalized with hydrophobic groups to form a modified DTPA, which has been found to demonstrate the ability to bind rare-earth elements effectively and also to release them in a reasonable pH range (pH 1-5). The hydrophobic groups include alkyl groups such as alkylamines. In particular, the DTPA may be modified by two hydrophobic ethylhexyl groups to comprise bis(ethylhexyl)amido DTPA.

A process for making modified DTPA-associated media for use in solid-liquid extraction of rare earth elements, may include functionalizing DTPA with hydrophobic groups to form modified DTPA; dissolving the modified DTPA into a methanol solution; loading the modified DTPA solution to a solid support; rotating the modified DTPA-loaded solid support to allow for association; and removing the methanol to obtain the modified DTPA-associated media.

The hydrophobic groups may include one or more alkyl groups. Pursuant to an implementation, the hydrophobic groups include alkylamines. Pursuant to a further development, the hydrophobic groups include two hydrophobic ethylhexyl groups.

The modified DTPA may have the following formula:

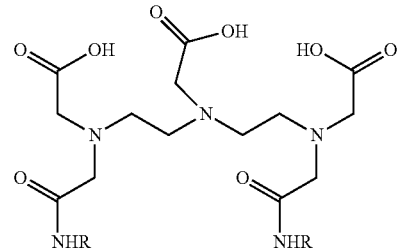

wherein R is $C_4H_9$, $C_6H_{13}$, $C_{12}H_{25}$, $C_{14}H_{29}$, or $C_{16}H_{33}$.

The solid support may include an organosilica platform.

The modified DTPA-loaded solid support may be rotated by centrifuging the modified DTPA-loaded solid support in the methanol solution at 15-50 rpm for approximately 1-5 hours at ambient temperature to allow for adequate association.

A modified DTPA-associated media for use in solid-liquid extraction, may include modified DTPA chemically associated with a solid support, wherein the modified DTPA includes DTPA functionalized with hydrophobic groups (e.g., alkyl groups, including but not limited to alkylamines).

The solid support may be an organosilica platform.

The hydrophobic groups may include one or more alkyl groups, including but not limited to alkylamines. Pursuant to an implementation, the hydrophobic groups include two hydrophobic ethylhexyl groups. Pursuant to another implementation, the hydrophobic groups include ethylene diamine or triethylene tetraamine.

The modified DTPA may have the following formula:

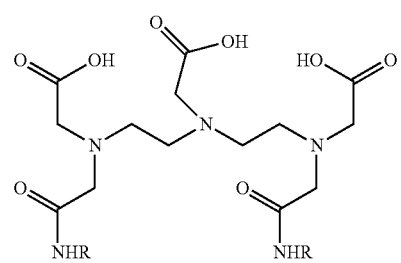

wherein R is $C_4H_9$, $C_6H_{13}$, $C_{12}H_{25}$, $C_{14}H_{29}$, or $C_{16}H_{33}$.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Further, the use of "at least one of" is intended to be inclusive, analogous to the term and/or. Furthermore, any numerical examples in the following discussion are intended to be non-limiting, and thus additional numerical values, ranges, and percentages are within the scope of the disclosed embodiments.

While the disclosed materials and processes have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A modified DTPA-associated media for use in solid-liquid extraction, comprising modified diethylenetriaminepentaacetic acid (DTPA) chemically associated via hydrophobic interactions with a hydrophobic solid support, wherein the modified DTPA includes DTPA functionalized with hydrophobic groups.

2. The modified DTPA-associated media of claim 1, wherein the hydrophobic solid support is an organosilica platform.

3. The modified DTPA-associated media of claim 1, wherein the hydrophobic groups includes one or more alkyl groups.

4. The modified DTPA-associated media of claim 1, wherein the hydrophobic groups includes two hydrophobic ethylhexyl groups.

5. The modified DTPA-associated media of claim 1, wherein the modified DTPA has the following formula:

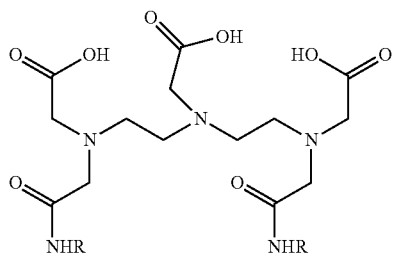

wherein R is $C_4H_9$, $C_6H_{13}$, $C_{12}H_{25}$, $C_{14}H_{29}$, or $C_{16}H_{33}$.

6. A process for making modified diethylenetriaminepentaacetic acid (DTPA)-associated media for use in solid-liquid extraction of rare earth elements, comprising:
functionalizing DTPA with hydrophobic groups to form modified DTPA;
dissolving the modified DTPA into a methanol solution;
loading the modified DTPA solution to a solid support;
rotating the modified DTPA-loaded solid support to allow for association; and
removing the methanol to obtain the modified DTPA-associated media;
wherein the modified DTPA is chemically associated via hydrophobic interactions with the solid support.

7. The process of claim 6, wherein the hydrophobic groups includes one or more alkyl groups.

8. The process of claim 6, wherein the hydrophobic groups includes two hydrophobic ethylhexyl groups.

9. The process of claim 6, wherein the modified DTPA has the following formula:

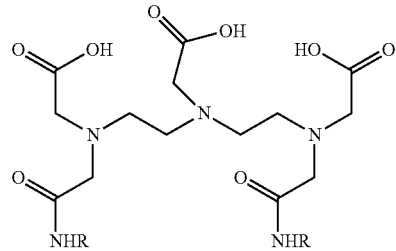

wherein R is $C_4H_9$, $C_6H_{13}$, $C_{12}H_{25}$, $C_{14}H_{29}$, or $C_{16}H_{33}$.

10. The process of claim 6, wherein the solid support comprises an organosilica platform.

11. The process of claim 6, wherein rotating the modified DTPA-loaded solid support includes centrifuging the modified DTPA-loaded solid support in the methanol solution at 15-50 rpm for approximately 1-5 hours at ambient temperature.

12. The modified DTPA-associated media of claim 1, wherein the hydrophobic groups anchor the modified DTPA to the solid support through hydrophobic interactions.

13. The modified DTPA-associated media of claim 1, wherein the modified DTPA remains chemically associated via said hydrophobic interactions with the solid support for at least five (5) cycles of re-use.

14. A solid-liquid extraction sorbent, comprising:
a modified DTPA-associated media including modified diethylenetriaminepentaacetic acid (DTPA) chemically associated with an organosilica solid support, wherein the modified DTPA includes DTPA functionalized with two hydrophobic groups; and
wherein the two hydrophobic groups anchor the modified DTPA to the organosilica solid support through hydrophobic interactions.

15. The solid-liquid extraction sorbent of claim 14, wherein the two hydrophobic groups includes one or more alkyl groups.

16. The solid-liquid extraction sorbent of claim 14, wherein the hydrophobic groups includes two hydrophobic ethylhexyl groups.

17. The solid-liquid extraction sorbent of claim 14, wherein the modified DTPA has the following formula:

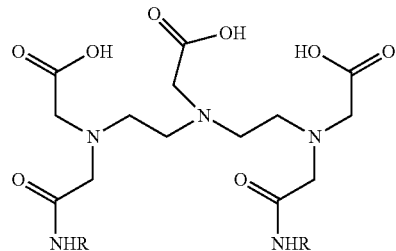

wherein R is $C_4H_9$, $C_6H_{13}$, $C_{12}H_{25}$, $C_{14}H_{29}$, or $C_{16}H_{33}$.

* * * * *